United States Patent
Chakkirala

(10) Patent No.: US 11,140,123 B2
(45) Date of Patent: Oct. 5, 2021

(54) COMMUNITY DETECTION BASED ON DNS QUERYING PATTERNS

(71) Applicant: Infoblox Inc., Santa Clara, CA (US)

(72) Inventor: Aruna Chakkirala, Bangalore (IN)

(73) Assignee: Infoblox Inc., Santa Clara, CA (US)

( * ) Notice: Subject to any disclaimer, the term of this patent is extended or adjusted under 35 U.S.C. 154(b) by 25 days.

(21) Appl. No.: 16/548,694

(22) Filed: Aug. 22, 2019

(65) Prior Publication Data

US 2020/0351237 A1 Nov. 5, 2020

Related U.S. Application Data

(60) Provisional application No. 62/840,794, filed on Apr. 30, 2019.

(51) Int. Cl.
| | |
|---|---|
| *H04L 29/12* | (2006.01) |
| *G06F 16/901* | (2019.01) |
| *H04L 29/06* | (2006.01) |
| *H04L 12/26* | (2006.01) |

(52) U.S. Cl.
CPC ...... *H04L 61/1511* (2013.01); *G06F 16/9024* (2019.01); *H04L 61/1552* (2013.01); *H04L 43/08* (2013.01); *H04L 43/0876* (2013.01); *H04L 63/1425* (2013.01); *H04L 63/20* (2013.01)

(58) Field of Classification Search
CPC . H04L 63/20; H04L 63/1441; H04L 63/1425; H04L 63/1408; H04L 61/1511; H04L 43/04; H04L 43/062; H04L 43/0876; H04L 63/145; H04L 61/1552; H04L 43/08; G06F 16/9024

See application file for complete search history.

(56) References Cited

U.S. PATENT DOCUMENTS

| | | | |
|---|---|---|---|
| 2007/0118669 A1* | 5/2007 | Rand ................... | H04L 61/1511 709/245 |
| 2015/0256424 A1* | 9/2015 | Kaliski, Jr. ........... | H04L 43/062 709/224 |
| 2016/0065611 A1* | 3/2016 | Fakeri-Tabrizi .... | H04L 63/1441 726/23 |

(Continued)

OTHER PUBLICATIONS

Blondel et al., Fast Unfolding of Communities in Large Networks, Journal of Statistical Mechanics: Theory and Experiment, An IOP and Sissa Journal, Oct. 9, 2008.

(Continued)

*Primary Examiner* — Jungwon Chang
(74) *Attorney, Agent, or Firm* — Van Pelt, Yi & James LLP

(57) ABSTRACT

Techniques for community detection based on DNS querying patterns are disclosed. For example, techniques for community detection based on DNS querying patterns for anomaly detection and monitoring efficiencies are disclosed. In some embodiments, a system, process, and/or computer program product for community detection based on DNS querying patterns includes receiving DNS log files, wherein the DNS log files include a DNS query and a DNS response for resolution of the DNS query; generating a graph based on the DNS log files; identifying a plurality of communities using the graph based on DNS querying patterns; and detecting an anomaly in DNS activity associated with one or more of the communities based on a DNS querying rule.

21 Claims, 7 Drawing Sheets

(56) References Cited

U.S. PATENT DOCUMENTS

2017/0041332 A1* 2/2017 Mahjoub ............ H04L 43/0876
2018/0176232 A1* 6/2018 Rodriguez ............ H04L 43/062

OTHER PUBLICATIONS

Blondel et al., Fast Unfolding of Communities in Large Networks, Jul. 25, 2008.
Clauset et al., "Finding Community Structure in Very Large Networks." Physical review E 70.6, 2004, 066111.
Danon et al., Comparing Community Structure Identification, Oct. 18, 2005.
Girvan et al., Community Structure in Social and Biological Networks, PNAS, Jun. 11, 2002, vol. 99, No. 12, pp. 7821-7826.
M.E.J. Newman, Analysis of Weighted Networks, Jul. 20, 2004.
M.E.J. Newman, Detecting Community Structure in Networks, 2004, pp. 1-11.
M.E.J. Newman, Finding Community Structure in Networks Using the Eigenvectors of Matrices, Jul. 23, 2006.
M.E.J. Newman, Modularity and Community Structure in Networks, Feb. 17, 2006.
M.E.J. Newman, Modularity and Community Structure in Networks, PNAS, Jun. 6, 2006, vol. 103, No. 23, pp. 8577-8582.
Newman et al., Finding and Evaluating Community Structure in Networks, Physical Review E 69, 206113, 2004.
Pons et al., Comuting Communities in Large Networks Using Random Walks, Journal of Graph Algorithms and Applications, vol. 10, No. 2, pp. 191-218 (2006).
Radicchi et al., Defining and Identifying Communities in Networks, PNAS, Mar. 2, 2004, vol. 101, No. 9, pp. 2658-2663.
Wu et al., Finding Communities in Linear Time: A Physics Approach, Oct. 26, 2003.
Aruna Chakkirala, Community Detection Based on DNS Querying Patterns, 2018.

* cited by examiner

| Time | Community | Source | Domains queried |
|---|---|---|---|
| T1 | C1 | N1, N2, N3 | eng1.datsa.com, sales.datsa.com |
| T1 | C2 | N4, N5 | erp.datsa.com |
| T2 | C1 | N1, N2, N3 | eng1.datsa.com, sales.datsa.com |
| T3 | C1 | N1, N2, N3 | eng1.datsa.com, sales.datsa.com, malspam.com |

FIG. 5

COMMUNITY DETECTION BASED ON DNS QUERYING PATTERNS

CROSS REFERENCE TO OTHER APPLICATIONS

This application claims priority to U.S. Provisional Patent Application No. 62/840,794 entitled COMMUNITY DETECTION BASED ON DNS QUERYING PATTERNS filed Apr. 30, 2019 which is incorporated herein by reference for all purposes.

BACKGROUND OF THE INVENTION

Generally, a client (e.g., a computing device) attempts to connect to a server(s) over the Internet by using web addresses (e.g., Uniform Resource Locators (URLs) including domain names or fully qualified domain names (FQDNs)); the aforesaid are translated into IP addresses. The Domain Name System (DNS) is responsible for performing this translation from web addresses into IP addresses. Specifically, requests including web addresses are sent to DNS servers that reply with corresponding IP addresses or with an error message in case the domain has not been registered, a non-existent domain (e.g., an NX Domain response, also referred to herein as an NXDOMAIN response, is returned by DNS servers for a non-existent domain). This mechanism is also used by malicious software (e.g., malware) to communicate with their Command-and-Control (C&C) center (e.g., botnet controller server(s) accessible via the Internet).

BRIEF DESCRIPTION OF THE DRAWINGS

Various embodiments of the invention are disclosed in the following detailed description and the accompanying drawings.

FIG. 5 illustrates an example table of detected communities in accordance with some embodiments.

DETAILED DESCRIPTION

Figure 1:
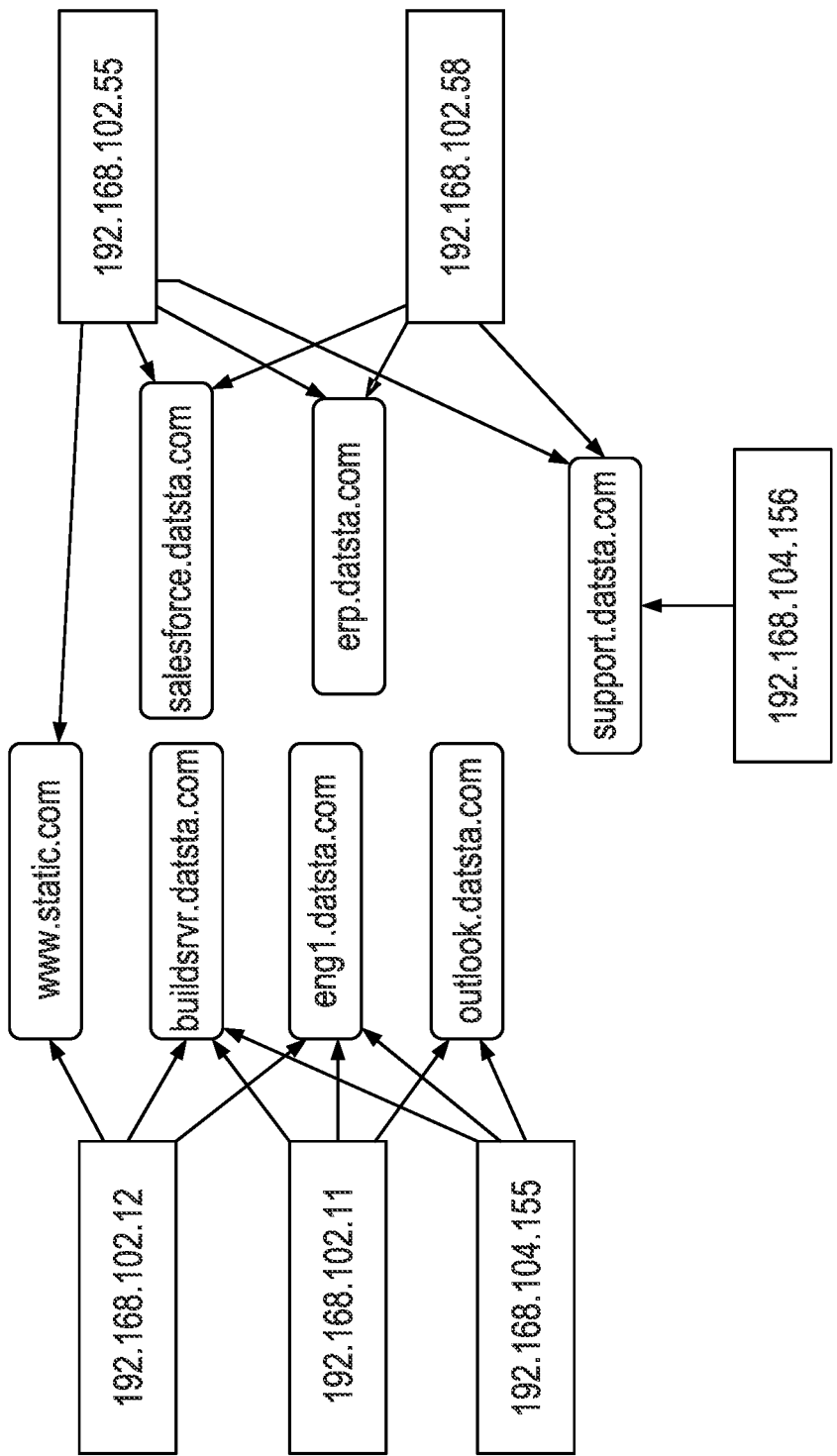
FIG. 1 illustrates a visual representation of a sample DNS log file in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Introduction to the Increasing Challenges with Monitoring DNS Activity for Network and Security Applications Generally, a client (e.g., a computing device) attempts to connect to a server(s) over the Internet by using web addresses (e.g., Uniform Resource Locators (URLs) including domain names or fully qualified domain names (FQDNs)); the aforesaid are translated into IP addresses. The Domain Name System (DNS) is responsible for performing this translation from web addresses into IP addresses. Specifically, requests including web addresses are sent to DNS servers that reply with corresponding IP addresses or with an error message in case the domain has not been registered, a non-existent domain (e.g., an NX Domain response, also referred to herein as an NXDOMAIN response, is returned by DNS servers for a non-existent domain). This mechanism is also used by malicious software (e.g., malware) to communicate with their Command-and-Control (C&C) center (e.g., botnet controller server(s) accessible via the Internet).

However, the rapid increase in DNS traffic through growing online/web services, Internet of Things (IoT), and "always on devices" can increase the difficulties in monitoring of traffic that can range in the billions of queries or more. For example, performing effective and efficient DNS traffic monitoring at this increasing scale and the ensuing information overload presents new and significant technical challenges. As such, providing DNS monitoring solutions that can scale to process and make sense of all the querying data despite the growing scale becomes increasingly important to provide effective and efficient DNS traffic monitoring solutions.

For example, applications can generate voluminous log files and aim to capture every action encountered. These log files are generally verbose and require domain knowledge to create interpretations. Transforming this large volume of log information into meaningful insights implies mining the data and applying appropriate algorithms.

Similar to any application, DNS also creates log files for every query it processes. Each log line captures the identity of a source which is raising a query for a particular domain. In response, it expects an appropriate resolver response which is most often an IP address. Considering the large volume of Internet traffic that a typical organization handles (e.g., an enterprise network), these log files tend to grow very quickly. But the logs contain the vital combination of source IP along with its queried domain which could indicate a behavioral aspect of the particular source. Analyzing a large dataset that includes many source IP addresses which have individually queried on domains can further reveal patterns of similarly behaving source IP addresses as further described below.

For instance, all members of a team (e.g., in a given entity, such as an enterprise) would likely be querying for domains which host a commonly used service in the team. The team members along with the rest of the organization will also query for public domains, such as google.com or yahoo.com. While the querying of public domains creates a relationship between most of the members, the stronger bond is signified by the commonly queried domains within the team. These clusters determined from similarly querying domains serve of interest here as they constitute a similarity in behavior within the cluster.

As such, DNS servers generally handle such DNS queries and create large verbose logs of DNS related query data (e.g., DNS log data). For example, the DNS log data can capture domains queried by many source IP addresses. Detecting patterns from large verbose logs of DNS related query data can present technical challenges for efficient and effective technology solutions as the size and scale of such DNS log data continues to increase in size and grow more complex (e.g., to find groups of similar source IP addresses and/or to identify groups that are associated with similarly behaving IP addresses, etc.). Thus, providing DNS monitoring solutions that can scale to process and make sense of all the querying data despite the scale becomes increasingly important to provide effective and efficient DNS traffic monitoring solutions.

Extracted DNS Dataset Represented as a Graph

A typical format of a DNS query log line is provided below.

1-Jan.-2018 15:01:21.997 client 172.205.42.215 #51341: query: eng-lab.beta.datasta.com IN A+(172.205.3.10)

Many such log lines exist and contain the useful information pair of the source IP and the queried domain.

A sample dataset can be created by extracting the source IP address, queried domain, and timestamp. This dataset can be further mined to, for example, extract all the source IP addresses which have queried for a particular domain.

Visualization of DNS Querying Patterns

The extracted dataset can then be represented as a graph. In an example graph, each of the source IP addresses forms a node in the graph, and each node has an edge with its neighbor provided they have exhibited some similar behavior. The similar behavior in this example is the queried domains and identifying all source IP addresses which have queried for the same domain. A graph is plotted with source IP addresses forming the nodes and edges are added when the nodes have mutually queried domains. The graph edges can also have weights computed from the number of mutually queried domains. Thus, the log data can be represented as an undirected weighted graph as further described below. As also further described below, community detection can be performed on the weighted undirected graph (e.g., in an example implementation, considering edges that have a weight greater than one).

In this example, a DNS server logs every such query call (e.g., DNS query). In such DNS server logs, a source IP address can be associated with a DNS query and a domain, and multiple source IP addresses can be logged querying on multiple domains. As such, source IP addresses can intersect on domains based on such processing of the DNS server logs (e.g., DNS log data).

FIG. 1 illustrates a visual representation of a sample DNS log file in accordance with some embodiments. In this example, each source IP address queries a set of domains and any overlaps are clearly visible in FIG. 1.

Figure 2:
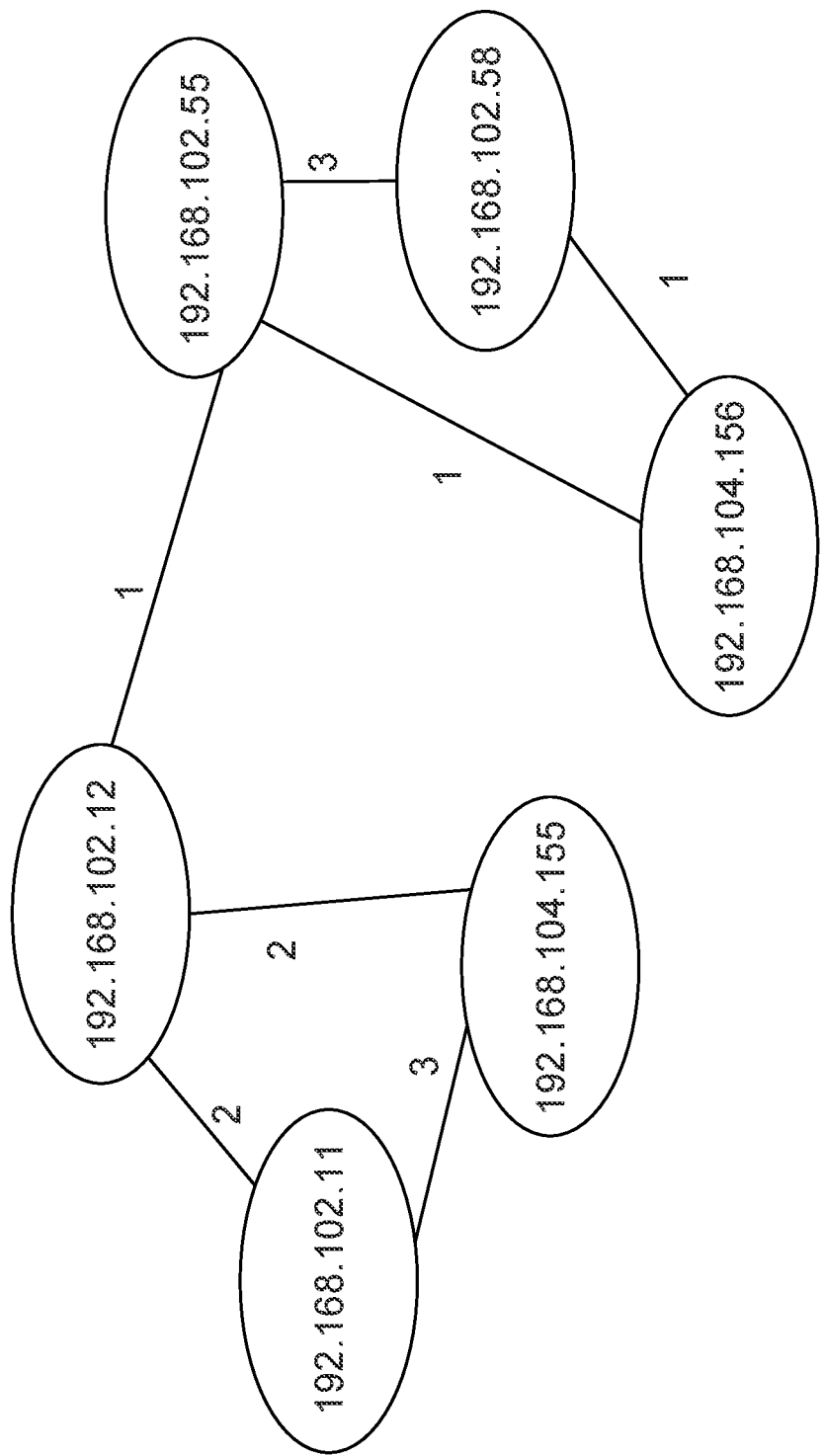
FIG. 2 illustrates a weighted undirected graph representation of a sample DNS log file in accordance with some embodiments.

FIG. 2 illustrates a weighted undirected graph representation of a sample DNS log file in accordance with some embodiments. The visual representation of the sample DNS log file as shown in FIG. 1 can be used to generate a weighted undirected graph representation as shown in FIG. 2. As shown, this example user querying scenario indicates that all the source IP addresses which belong to the same group have some similarities in their querying patterns. The similarities and relationship between source IP addresses can be represented as an undirected weighted graph. Graph nodes with mutually queried domains have an edge of weight one. And when there is more than one mutually queried domain, the edge weight is higher based on the number of mutually queried domains.

Overview of Techniques for Community Detection Based on DNS Querying Patterns

Techniques for community detection based on DNS querying patterns are disclosed. For example, new and improved DNS monitoring solutions that conduct behavioral anomaly detection and community or group level monitoring are needed. Accordingly, in some embodiments, techniques for community detection based on DNS querying patterns for anomaly detection and monitoring efficiencies are disclosed.

As an overview of one embodiment, DNS servers capture the domain querying activity initiated by various source IP addresses (e.g., a client, server, or other computing device associated with an IP address). For example, a single user querying a domain generally has little to no meaning beyond the purpose it serves. However, a collective of such calls from the user may reveal something about the user while an analysis of multiple users and their querying patterns can also provide useful insights. This DNS log data can be represented as a weighted undirected graph (e.g., such as shown in FIG. 2) between the source IP addresses. In this example, the nodes of the graphs have edges if and only if they have queried for a common domain. The edge weight is another important factor that quantifies the number of mutually queried domains and hence the affinity between the two nodes. The available data from the DNS logs can be transformed into a weighted undirected graph and then fed into a community detection processing operation. The community detection processing operation can be implemented using, for example, the Louvain modularity premise, and the output provides a grouping of nodes based on the input graph, which can identify similarly behaving source IP addresses, as will be further described below with respect to various embodiments.

Accordingly, in some embodiments, a system, process, and/or computer program product for community detection based on DNS querying patterns includes receiving DNS log files, wherein the DNS log files include a DNS query and a DNS response for resolution of the DNS query; generating a graph based on the DNS log files (e.g., a weighted undirected graph based on source IP addresses); identifying a plurality of communities using the graph based on DNS querying patterns (e.g., community detection can be performed based on association of the DNS querying patterns and source IP addresses in the weighted undirected graph); and detecting an anomaly in DNS activity associated with one or more of the communities based on a DNS querying rule (e.g., the DNS querying rule can be applied to one or more of the plurality of communities for detecting the anomaly in the DNS activity associated with the one or more of the plurality of communities).

In some embodiments, a system, process, and/or computer program product for community detection based on DNS querying patterns further includes storing the plurality of communities in a community detection table.

In some embodiments, a system, process, and/or computer program product for community detection based on DNS querying patterns further includes receiving a DNS data stream (e.g., a live stream of DNS traffic), wherein the DNS data stream includes a DNS query and a DNS response for resolution of the DNS query; processing domains queried in the DNS data stream; and updating a community detection table, wherein the community detection table stores the plurality of communities.

In some embodiments, a system, process, and/or computer program product for community detection based on DNS querying patterns further includes detecting a compromised community in the plurality of communities based on the DNS querying pattern rule.

In an example implementation, communities are detected based on the querying behavior exhibited by sources (e.g., source IP addresses, such as a client, server, or other computing device associated with an IP address). This community detection technique provides the ability to capture community level behavioral changes over time and use this comparative knowledge to, for example, detect anomalies in DNS querying behavior. The detected communities can also facilitate efficient DNS monitoring techniques as further described below.

For example, enterprises generally have access to their DNS query logs and various summaries but typically do not have the tools to efficiently and effectively process that DNS log data to make sense of all that DNS log data. Accordingly, the disclosed techniques provide enterprises (e.g., and other entities with network related data including DNS related data, such as DNS log data) with the ability to protect and understand their networks better. In some embodiments, the disclosed techniques include grouping similarly behaving source IP addresses from the DNS queries into communities. The detected communities serve as a higher level of abstraction, aiding in anomaly detection and efficient query monitoring as will be further described below.

In some embodiments, the disclosed techniques include detecting community structures from networks or graphs generated from DNS query data. As further described below, the appearance of densely connected groups of vertices with sparse connections between groups can be detected using edge weights in weighted graphs (e.g., such as shown in FIG. 2). Various community detection algorithms (e.g., hierarchical clustering or other graph/clustering related algorithms) can be implemented to perform the disclosed techniques for community detection based on DNS query patterns. As an example, divisive clustering algorithms detect intercommunity links and remove them. As another example, agglomerative clustering algorithms merge similar nodes/communities recursively. As yet another example, Girvan and Newman (2002) use edge betweenness to detect communities (see, e.g., [5] Girvan M and Newman M E J, 2002 Proc. Natl. Acad. Sci. USA 997821).

In an example implementation, the Louvain algorithm is used for implementing the disclosed techniques for community detection based on DNS query patterns. Generally, the Louvain method for community detection is agglomerative; optimization methods are based on the maximisation of an objective function—modularity. Precise formulations of this optimization problem are known to be computationally intractable. Modularity of a partition is a scalar value between −1 and 1, and measures the density of links inside communities as compared to links between communities. Modularity for weighted graphs, such as can be applied to the above described weighted graphs for DNS log data, is shown by the below calculation (see, e.g., [2] Vincent D. Blondel, Jean-Loup Guillaume, Renaud Lambiotte, Etienne Lefebvre—Fast unfolding of communities in large networks (2008) arXiv:0803.0476v2 [physics.soc-ph] (e.g., describing the below modularity formula)).

$$Q = \frac{1}{2m} \sum_{i,j} \left[ A_{ij} - \frac{k_i k_j}{2m} \right] \delta(c_i, c_j), \quad (1)$$

where $A_{ij}$ represents the weight of the edge between $i$ and $j$, $k_i = \sum_j A_{ij}$ is the sum of the weights of the edges attached to vertex $i$, $c_i$ is the community to which vertex $i$ is assigned, the $\delta$-function $\delta(u, v)$ is 1 if $u = v$ and 0 otherwise and $m = \frac{1}{2} \sum_{ij} A_{ij}$.

These and other techniques for community detection based on DNS query patterns will be further described below.

The disclosed techniques can be applied to detect communities from DNS querying behavior, and in some implementations, using that as a basis for enhancing DNS security as further described below. As such, the ability to process and cluster DNS traffic based on querying behavior can also facilitate visualizing, identifying, and performing actions based on detected anomalous DNS traffic patterns as will also be further described below.

Various system and process embodiments for performing the disclosed techniques for community detection based on DNS querying patterns will now be further described below.

Community Detection

Many systems of scientific interest can be represented as networks, sets of nodes, or vertices joined in pairs by lines or edges (see, e.g., [1] Newman M E J (2006) Modularity and community structure in networks. Proc Natl Acad Sci 103(23): 8577-8582). One issue that has received a considerable amount of attention is the detection and characterization of community structure in networks (see, e.g., [3] Newman M. E. J. (2004) Eur. Phys. J. B 38:321-330; [4] Danon L., Duch J., Diaz-Guilera A., Arenas A. (2005) J. Stat. Mech, P09008), meaning the appearance of densely connected groups of vertices, with only sparser connections between groups (see, e.g., [1] Newman M E J (2006) Modularity and community structure in networks. Proc Natl Acad Sci 103(23): 8577-8582).

A promising approach involves decomposing the networks into sub-units or communities, which are sets of highly inter-connected nodes. The identification of these communities is useful as they may help to uncover a priori unknown functional modules such as topics in information networks or cyber communities in social networks. Moreover, the resulting meta network, whose nodes are the communities, may then be used to visualize the original network structure (see, e.g., [2] Vincent D. Blondel, Jean- Loup Guillaume, Renaud Lambiotte, Etienne Lefebvre—Fast unfolding of communities in large networks (2008) arXiv:0803.0476v2 [physics.soc-ph]).

The problem of community detection generally includes the partition of a network into communities of densely connected nodes, with the nodes belonging to different communities being only sparsely connected. Precise formulations of this optimization problem are known to be computationally intractable. Several algorithms have therefore been proposed to find reasonably good partitions in a reasonably fast way. This search for fast algorithms has attracted much interest in recent years due to the increasing availability of large network data sets and the impact of networks on everyday life. One can distinguish several types of community detection algorithms, such as the following: (a) divisive algorithms (e.g., divisive clustering algorithms) detect intercommunity links and remove them from the network (see, e.g., [5] Girvan M and Newman M E J, 2002 Proc. Natl. Acad. Sci. USA 997821; [6] Newman M E J and Girvan M, 2004 Phys. Rev. E 69 026113; [7] Radicchi F, Castellano C, Cecconi F, Loreto V and Parisi D, 2004 Proc. Natl. Acad. Sci. USA 101 2658), (b) agglomerative algorithms (e.g., agglomerative clustering algorithms) merge similar nodes/communities recursively (see, e.g., [8] Pons P and Latapy M, 2006 Journal of Graph Algorithms and Applications 10 191); and (c) optimization methods are based on the maximization of an objective function (e.g., modularity or another objective function) (see, e.g., [9] Clauset A, Newman M E J and Moore C, 2004 Phys. Rev. E 70 066111; [10] Wu F and Huberman B A, 2004 Eur. Phys. J. B 38 331; [11] Newman M E J, 2006 Phys. Rev. E 74 036104). The quality of the partitions resulting from these methods is often measured by the so-called modularity of the partition. The modularity of a partition is a scalar value between −1 and 1 that measures the density of links inside communities as compared to links between communities (see, e.g., [5] Girvan M and Newman M E J, 2002 Proc. Natl. Acad. Sci. USA 997821; [12] Newman M E J, 2006 Proc. Natl. Acad. Sci. USA 103 8577). In the example case of weighted networks (e.g., weighted networks are networks that have weights on their links, such as the number of communications between two mobile phone users), it is defined as shown below (see, e.g., [13] Newman M E J, 2004 Phys. Rev. E 70 056131 (e.g., describing the modularity measure); and [2] Vincent D. Blondel, Jean-Loup Guillaume, Renaud Lambiotte, Etienne Lefebvre—Fast unfolding of communities in large networks (2008) arXiv: 0803.0476v2 [physics.soc-ph] (e.g., describing the below modularity formula)).

$$Q = \frac{1}{2m}\sum_{i,j}\left[A_{ij} - \frac{k_i k_j}{2m}\right]\delta(c_i, c_j), \quad (1)$$

where $A_{ij}$ represents the weight of the edge between $i$ and $j$, $k_i = \sum_j A_{ij}$ is the sum of the weights of the edges attached to vertex $i$, $c_i$ is the community to which vertex $i$ is assigned, the $\delta$-function $\delta(u, v)$ is 1 if $u = v$ and 0 otherwise and $m = \frac{1}{2}\sum_{ij} A_{ij}$.

Community Detection for DNS Logs Data Findings

Figure 3:
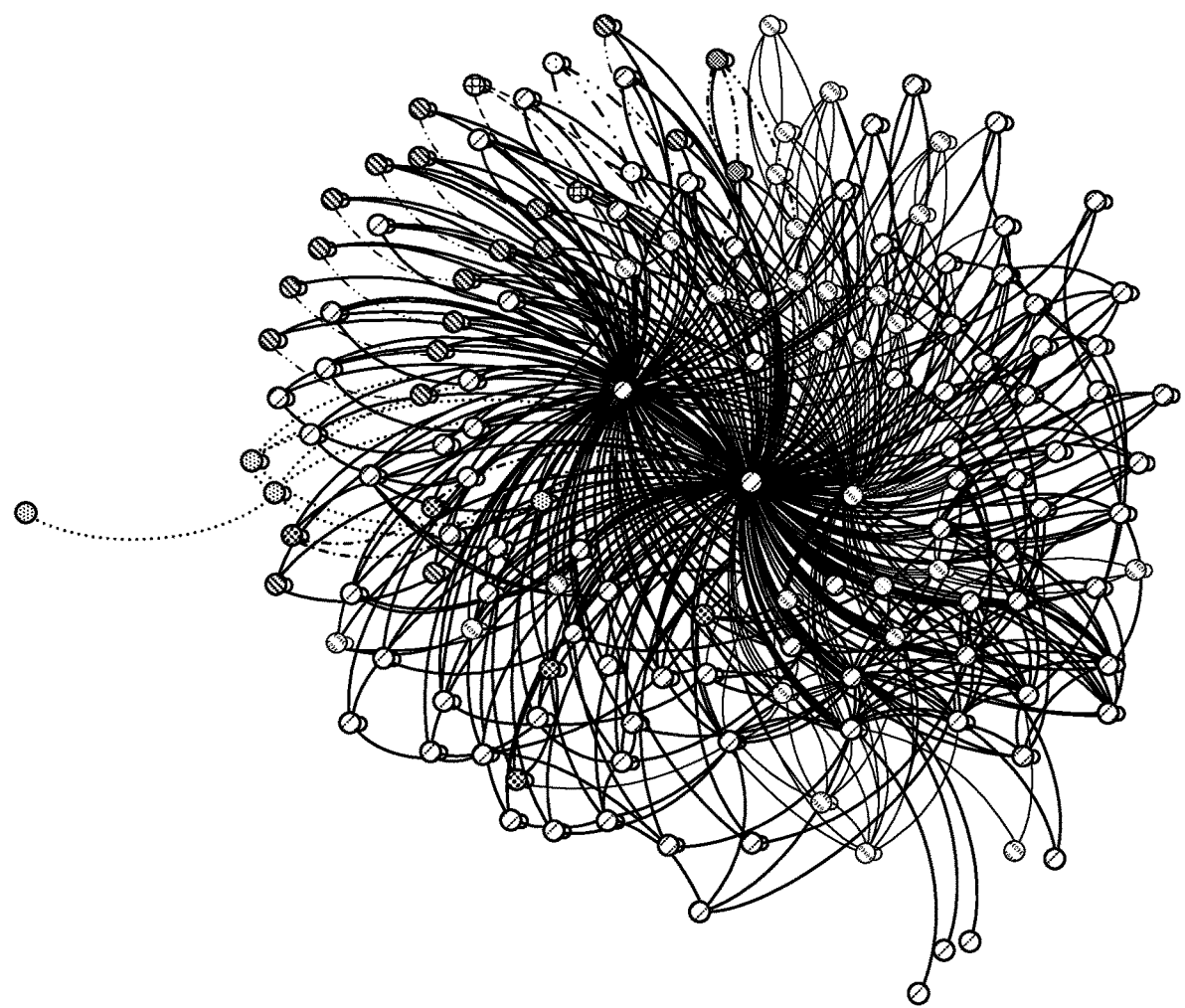
FIG. 3 illustrates a visual representation of detected communities from a weighted undirected graph in accordance with some embodiments.

FIG. 3 illustrates a visual representation of detected communities from a weighted undirected graph in accordance with some embodiments. In this example, the resulting graph created from the sample DNS logs has 154 nodes and 751 edges. Only edges within a minimum weight of 2 were considered to eliminate nodes with only a single common queried domain. The community detection and visualization was performed using Gephi, which is an open source network analysis and visualization software package (e.g., available at https://gephi.org/), using its built-in modularity algorithm. The graph created from the DNS logs served as the input dataset for Gephi and the modularity algorithm was applied on the dataset. The Gephi run resulted in 17 detected communities through the Louvain modularity algorithm. From this list of detected communities, those communities with a membership of less than 1.3% were given the color grey. The rest of the communities were given distinctive colors other than grey to provide a visual representation of the identified communities as shown in FIG. 3.

Figure 4:
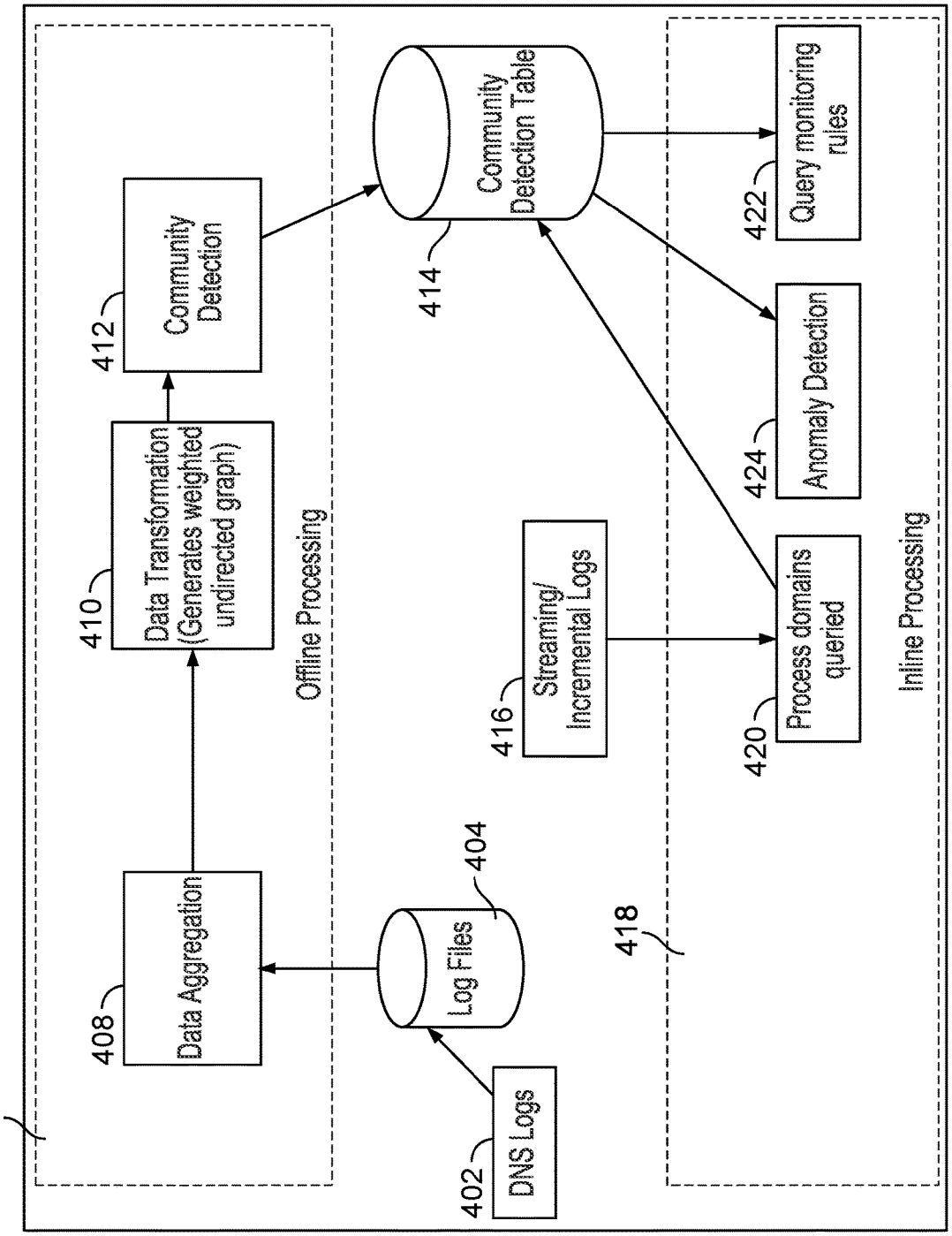
FIG. 4 is a diagram of a system architecture for community detection based on DNS querying patterns in accordance with some embodiments.

Overview of a System and a System Architecture for Community Detection Based on Dns Querying Patterns FIG. 4 is a diagram of a system architecture for community detection based on DNS querying patterns in accordance with some embodiments. FIG. 4 illustrates a multi-stage automated community detection based on a DNS querying patterns analysis system that can be deployed for anomaly detection for DNS networking activities, such as on an enterprise network or other network computing environment.

Referring to FIG. 4, DNS logs 402 are stored in a log files data store 404 (e.g., using a mongoDB® (available at https://www.mongodb.com/), another open source or commercially available data store, or an enterprise cloud data center service, such as Amazon Web Services® or another enterprise cloud data center service) and are provided to an offline processing subsystem as shown at 406 (e.g., the inline processing subsystem implemented on server class hardware, which can be an enterprise data center server or using an enterprise cloud data center service, such as Amazon Web Services® or another enterprise cloud data center service). The offline processing subsystem includes a data aggregation component 408 (e.g., using Logstash (available at https://www.elastic.co/products/logstash) or another open source or commercially available server-side pipeline that can ingest DNS log files data from one or more sources and transform the data for generating the graph). In an example implementation, the passive log files can be ingested through Logstash or other such open source or commercially available software or tools. In another example implementation, the DNS logs can also be converted into an optimized format like Parquet file format (e.g., Apache Parquet for processing using Apache Hadoop), and stored on an enterprise cloud data center service, such as Amazon Web Services® or another enterprise cloud data center service. In one embodiment, data aggregation is performed by ingesting the raw DNS log parameters and extracting features suitable for further transformation. In this phase, the details around each source and the queried domains can be converted into a list of source IP addresses mapped to their domains queried or a list of domains mapped to the source IP addresses generating the queries. Most data stores provide aggregation capabilities either though SQL-like queries, through open source tools like Pyspark, or other such open source software or tools.

Below is a post aggregation example:

| IP address | Domains queried |
| --- | --- |
| 192.168.102.12 | buildsrv.datsa.com, eng1datsacom, www.static.com |
| 192.168.102.11 | buildsrv.datsa.com, eng1datsacom, outlook.datsa.com |
| 192.168.104.155 | buildsrv.datsa.com, eng1datsacom, outlook.datsa.com |

| Domain | IP address |
| --- | --- |
| buildsrv.datsa.com | 192.168.102.12, 192.168.102.11, 192.168.104.155 |
| eng1datsacom | 192.168.102.12, 192.168.102.11, 192.168.104.155 |
| outlook.datsa.com | 192.168.102.11, 192.168.104.155 |

The aggregated DNS log files data is provided to a data transformation component 410 (e.g., using Intel's open source project Graph Builder for Apache Hadoop software (available at https://01.org/graphbuilder) or another open source or commercially available library for generating the graph using the processed DNS log files data) that transforms the DNS log files data to generate a weighted undirected graph based on the source IP address as similarly described above with respect to FIGS. 1 and 2. In an example implementation, the aggregated data from the previous step is then transformed into a graph using Networkx, Pyspark, or other such open source or commercially available software or tools. A custom Python script can be used to extract the graph details, in which nodes are the unique source IP addresses from our previously extracted features, and the list of domains queried is used to calculate the edge weight. The Python script can use open source libraries, such as Networkx, to create and store the graph generated from the prior extracted features.

The weighted undirected graph of the DNS data is then processed to perform community detection using a community detection component 412. The community detection component can be implemented using a community detection processing algorithm as similarly described above and further described below. Specifically, communities are detected based on the querying behavior exhibited by a source IP address using the weighted undirected graph. As discussed above, these communities serve well in tackling scale and the ensuing information overload for the large and increasing size of DNS datasets.

In an example implementation, the Louvain algorithm is used for implementing the disclosed techniques for community detection based on DNS query patterns. Generally, the Louvain method for community detection is agglomerative; optimization methods are based on the maximisation of an objective function—modularity. Precise formulations of this optimization problem are known to be computationally intractable. Modularity of a partition is a scalar value between −1 and 1, and measures the density of links inside communities as compared to links between communities. Modularity for weighted graphs, such as can be applied to the above described weighted graphs for DNS log data, is shown by the below calculation (see, e.g., [2] Vincent D. Blondel, Jean-Loup Guillaume, Renaud Lambiotte, Etienne Lefebvre—Fast unfolding of communities in large networks (2008) arXiv:0803.0476v2 [physics.soc-ph] (e.g., describing the below modularity formula)).

$$Q = \frac{1}{2m} \sum_{i,j} \left[ A_{ij} - \frac{k_i k_j}{2m} \right] \delta(c_i, c_j), \quad (1)$$

where $A_{ij}$ represents the weight of the edge between $i$ and $j$, $k_i = \sum_j A_{ij}$ is the sum of the weights of the edges attached to vertex $i$, $c_i$ is the community to which vertex $i$ is assigned, the $\delta$-function $\delta(u, v)$ is 1 if $u = v$ and 0 otherwise and $m = \frac{1}{2} \sum_{ij} A_{ij}$.

In an example implementation, the community detection and visualization is implemented using an open source network analysis and visualization software package, such as Gephi (e.g., available at https://gephi.org/ or another open source/commercially available network analysis and visualization software package can be similarly implemented for processing the Networkx/other formatted graph of DNS data to perform community detection using the disclosed techniques), using its built-in modularity algorithm. The graph created from the DNS logs (e.g., Networkx/other formatted graph of DNS data) is provided as the input dataset for Gephi and the modularity algorithm is applied on the dataset to perform community detection using the disclosed techniques.

In one embodiment, the Louvain algorithm is performed for implementing the disclosed techniques for community detection based on DNS query patterns. In an example implementation, the Gephi implementation of the Louvain algorithm is utilized for implementing the disclosed techniques for community detection based on DNS query patterns. In another example implementation, an open source implementation of the Louvain algorithm is utilized for implementing the disclosed techniques for community detection based on DNS query patterns, such as using the Python Package Index (PyPI) (e.g., available at https://pypi.org). The graph can be stored either in a matrix or adjacency list or in other forms depending on the software utilized. The previously created graph is provided as input to the library which returns the detected communities from the graph.

In other example implementations, various other community detection algorithms (e.g., hierarchical clustering or other graph/clustering related algorithms) can be implemented to perform the disclosed techniques for community detection based on DNS query patterns. As an example, divisive clustering algorithms detect intercommunity links and remove them. As another example, agglomerative clustering algorithms merge similar nodes/communities recursively. As yet another example, Girvan and Newman (2002) use edge betweenness to detect communities (see, e.g., [5] Girvan M and Newman M E J, 2002 Proc. Natl. Acad. Sci. USA 997821).

The output of the community detection component is stored in a community detection table 414. In one embodiment, the community detection table is stored in a relational database or a non-relational database with the ability to perform quick searches on the communities and its members. In an example implementation, the community table is stored in a NoSQL data store, such as MongoDB or AWS DynamoDB which has storage as well as quick search capabilities. FIG. 5 illustrates an example table of detected communities as further described below. In this example implementation, the community detection table is periodically updated based on streaming/incidental DNS logs as shown at 416 using an inline processing subsystem 418 (e.g., the inline processing subsystem implemented on server class hardware, which can be an enterprise data center server or using an enterprise cloud data center service, such as Amazon Web Services® or another enterprise cloud data center service). The streaming/incremental logs of DNS data are provided to process domains queried component 420. The process domains queried component periodically extracts out features for a source IP address and all its queried domains and then uses the extracted information to detect recently created communities. For example, when the streaming/incremental logs are received in a Parquet format, open source tools such as Pyspark or other such open source software/tools can be used as similarly described above. Alternative other methods may be implemented based on the format, mechanism of the streaming/incremental logs, etc.

Query monitoring rules 422 (e.g., also referred to herein as DNS querying rules) provide a set of rules for monitoring DNS queries for performing various applications using the disclosed system. Example applications can include anomaly detection for DNS networking activities or other networking performance or other security related applications. Example rules can use various relative measures based on community behavior (e.g., which can avoid pessimistic (false positives) or optimistic rules adding to monitoring efficiency). Various example rules for monitoring DNS queries will now be described below.

As an example, rules for monitoring DNS queries can include rules for detecting threats or infected communities (e.g., a community that includes disease carriers/devices that are infected with malware). If one member in a community is malware ridden, others in that community could be vulnerable given that they visit similar sites (e.g., and can be infected with the same malware). This provides the ability to detect potential threat carriers. The member in this context could be a host or a device (e.g., a printer, an IoT device, a client, a server, and/or another device), which has initiated the query call. Specifically, a rule can identify any communities which have queried any known malware/Indicators of Compromise (IOCs) (e.g., also referred to herein as DNS querying IOCs or querying IOCs, as such communities can be at risk and portend other similarly infected hosts in such communities). The rule can be performed to identify any at risk/compromised communities and one or more responsive actions can be performed, such as the following: (1) perform a notification (e.g., to the end users and/or system/network administrators); (2) generate a report (e.g., an anomaly report can be included in a DNS network/security report); (3) perform a quarantine action (e.g., quarantine one or more of the malware infected devices from the enterprise network or from accessing sensitive resources on the enterprise network or Internet); (4) perform security scan(s) and/or perform check(s) for OS/application software updates; (5) and/or various other responsive actions can be performed or combinations of the above actions can be performed. The other hosts in those vulnerable communities can also be scanned for lurking malware or viruses and ensure all OS/applications are currently updated and/or other responsive actions can be performed as similarly described above.

As another example, rules for performing relative monitoring (e.g., instead of just using blanket rules) can be performed. General rules can be created across all DNS traffic to detect abnormal behaviors (e.g., anomalous DNS/networking related activities). These rules can tend towards being very pessimistic resulting in some false positives or optimistic in which case they can result in false negatives. A security analyst who reviews any detected anomalous DNS/networking related activities through the rule violations may get biased by the existence of the false positives or false negatives. As such, to alleviate this, each of the relative filters can be applied at the community level that is appropriate to the community's behavior instead of a blanket rule used across all traffic. For example, a rule can be configured to alert when community traffic is $t2>10*t1$, where $t1$ is average observed traffic activity for community $c1$, and $t2$ is the current traffic activity of community $c1$ (e.g., to detect a relative spike in DNS activity associated with a given community, as such may be associated with malware activity such as Command and Control (CNC) related activities). As would now be apparent to one of ordinary skill in the art, various other such rules can be similarly configured to provide relative filters at the community level for DNS security applications.

As yet another example, rules for performing qualitative measures can be performed. An example qualitative rule can monitor for DNS queries based on the type of domain queried (e.g., a domain that is a newly created domain, such as less than one week or less than one day old, or another time measure). Based on the monitored querying pattern based on the types of domains queried, the communities can be given risk levels. As a first example qualitative rule, if the applied rule identifies a community that suddenly starts querying domains that are young (e.g., domains created two days ago or younger) relative to a previous monitored pattern of querying, then that community can be labeled a high risk community (e.g., and in some cases, a high risk community label can be configured to have more focused monitoring performed for the DNS activities associated with that community). In this example rule implementation, this rule can be configured to detect a relative, significant deviation from its previous observed pattern of querying older/not such young domains. As a second example qualitative rule, if a community is detected that starts querying a known IOC relative to a previous monitored pattern of querying, then that community can also be labeled a high risk community (e.g., and in some cases, a high risk community label can be configured to have more focused monitoring performed for the DNS activities associated with that community).

As an additional example, rules for performing quantitative measures can be performed. An example quantitative rule can monitor for when a DNS querying rate for a community changes significantly from a previous time window(s), and if so, the community can be assigned a risk level. In this example, depending on the quantum increase in querying rate, the community can be labeled high or medium risk. These risk labeled communities can be highlighted for more visibility, further or more DNS querying pattern-based rules monitoring, and/or selected for further offline/manual investigation by a security analyst(s)/team(s). As such, the networking/security computing and/or personnel related resources can be deployed more efficiently to facilitate focused monitoring on the communities detected to be at highest risk based on these DNS querying pattern rules. Further, specialized filters with more stringent rules can also be applied to monitor these risk labeled communities.

As yet an additional example, communities can also be identified and selected for introspective analysis for any abnormally behaving members in such communities. For example, any of the above described quantitative and/or qualitative rules can be similarly applied to a subset of the members of the community to detect outliers within a given community (e.g., a host that exhibits a sudden spike in DNS activities and/or another host that exhibits a sudden change in DNS querying patterns as it is frequently querying young/less than 1-week old domains).

As will now be apparent to one of ordinary skill in the art, these and or various other rules for DNS querying patterns can be similarly implemented using the disclosed community detection techniques for DNS querying patterns to perform various networking and/or security related applications.

Referring to FIG. 4, an anomaly detection component 424 utilizes the community detection table and DNS querying monitoring rules to perform anomaly detection. For example, one or more of the querying monitoring rules described above can be implemented to facilitate anomaly detection based on DNS querying patterns detected in one or more communities. In some cases, anomaly detection can be performed by observing the temporal querying behavior of the communities. The detected communities also provide a higher abstraction level and monitoring can be conducted for collective community behavior using one or more DNS querying monitoring rules.

An example of anomaly detection includes detecting potential threat carriers as similarly discussed above. For instance, if one member in a community is compromised (e.g., infected with malware), then other members in that community could be vulnerable given that they visit similar sites (e.g., and can become infected with the same malware) indicating potential threat carriers. Another instance of anomaly detection is observing changes in collective community querying behavior or querying rate to flag potential bad communities. Additionally appropriate rule creation using relative measures based on community behavior can avoid pessimistic (false positives) or optimistic rules adding to monitoring efficiency as similarly described above.

FIG. 5 illustrates an example table of detected communities in accordance with some embodiments. For example, detected communities table 502 can be generated using the system and community detection components 412 and community detection table 414 as similarly described above with respect to FIG. 4 as similarly described above.

Additional example processes for community detection based on DNS querying patterns will now be described.

Example Processes for Community Detection Based on DNS Querying Patterns

Figure 6:
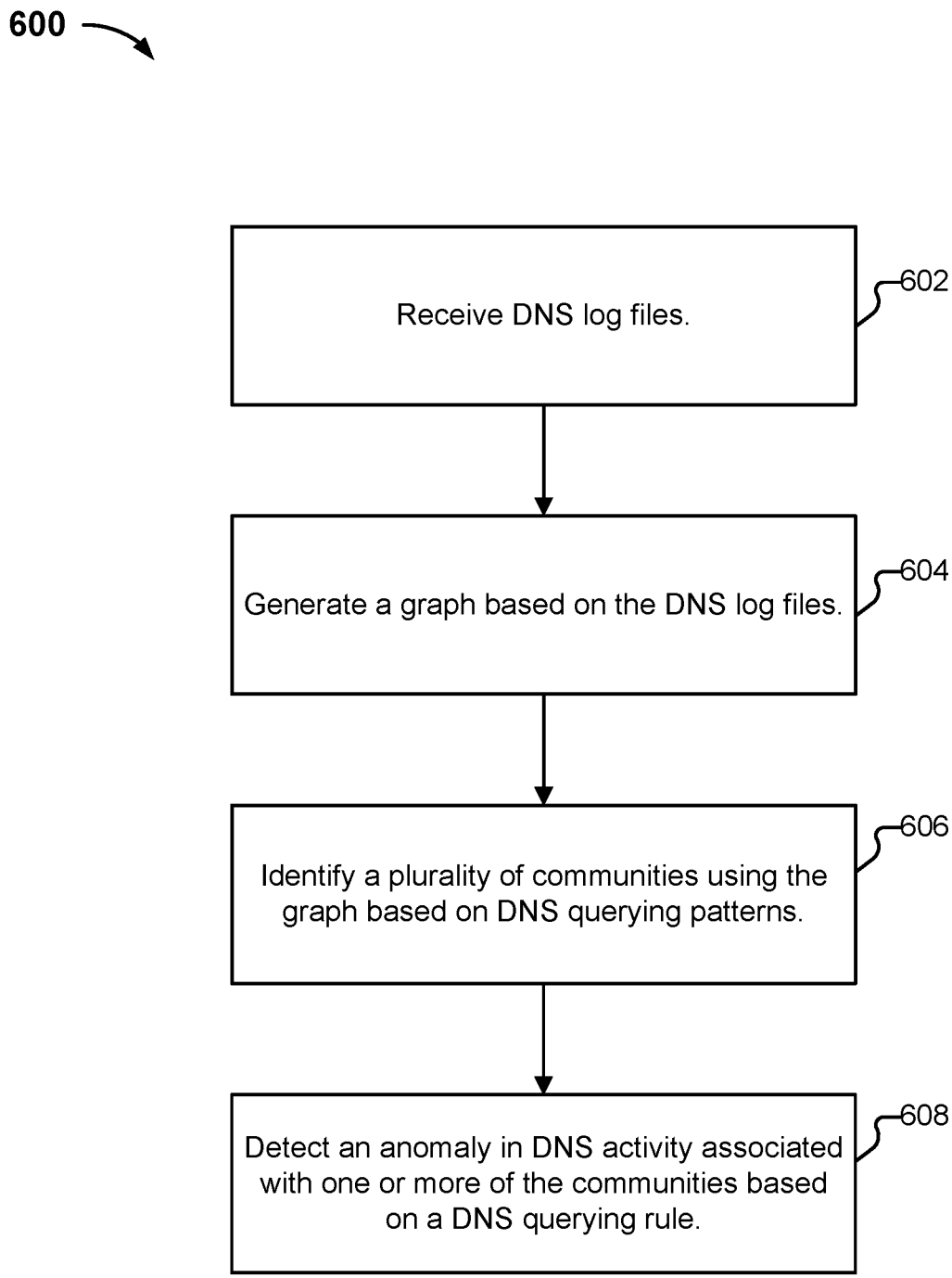
FIG. 6 is a flow diagram illustrating a process for community detection based on DNS querying patterns in accordance with some embodiments.

FIG. 6 is a flow diagram illustrating a process for community detection based on DNS querying patterns in accordance with some embodiments. In various embodiments, process 600 is performed by the system(s) and techniques described above with respect to FIGS. 1 through 4.

At 602, DNS log files are received. For example, the DNS log files can include a DNS query and a DNS response for resolution of the DNS query.

At 604, generating a graph based on the DNS log files is performed. For example, various techniques are disclosed for generating a graph based on the DNS log files as similarly described above. In an example implementation, a weighted undirected graph can be generated based on the DNS log files data as similarly describe above with respect to FIGS. 1 and 2.

At 606, identifying a plurality of communities using the graph based on DNS querying patterns is performed. For example, various techniques are disclosed for identifying a plurality of communities using the graph based on DNS querying patterns as similarly described above. In an example implementation, the Louvain method or other hierarchical clustering algorithms can be implemented to extract the communities using a weighted undirected graph based on source IP address data as similarly described above with respect to FIG. 4.

At 608, detecting an anomaly in DNS activity associated with one or more of the communities based on a DNS querying rule is performed. For example, various DNS monitoring rules can be applied to the communities for detecting an anomalous DNS querying rule as similarly described above.

Figure 7:
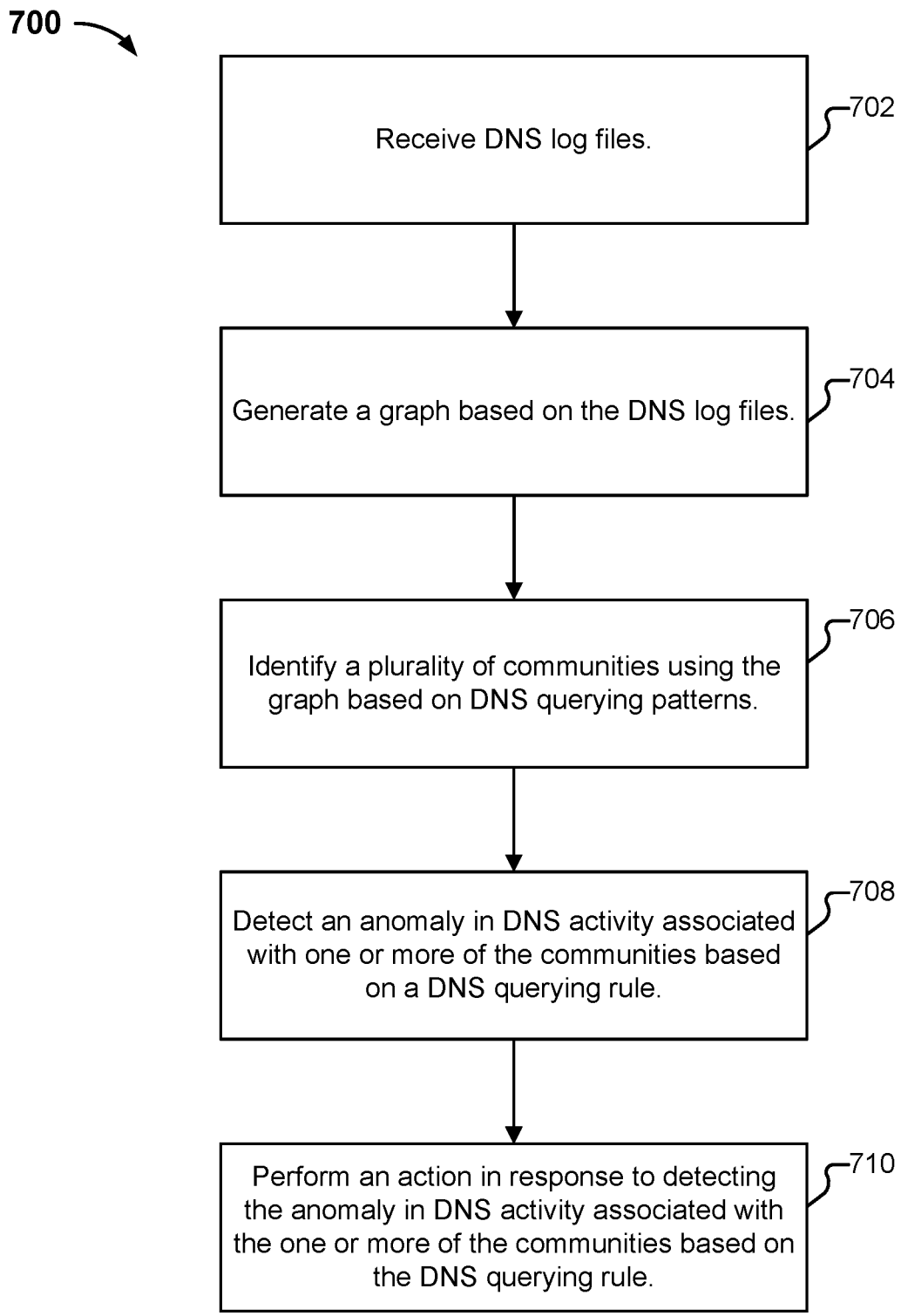
FIG. 7 is another flow diagram illustrating a process for community detection based on DNS querying patterns in accordance with some embodiments.

FIG. 7 is another flow diagram illustrating a process for community detection based on DNS querying patterns in accordance with some embodiments. In various embodiments, process 700 is performed by the system(s) and techniques described above with respect to FIGS. 1 through 4.

At 702, DNS log files are received. For example, the DNS log files can include a DNS query and a DNS response for resolution of the DNS query.

At 704, generating a graph based on the DNS log files is performed. For example, various techniques are disclosed for generating a graph based on the DNS log files as similarly described above. In an example implementation, a weighted undirected graph can be generated based on the DNS log files data as similarly described above with respect to FIGS. 1 and 2.

At 706, identifying a plurality of communities using the graph based on DNS querying patterns is performed. For example, various techniques are disclosed for identifying a plurality of communities using the graph based on DNS querying patterns as similarly described above. In an example implementation, the Louvain method or other hierarchical clustering algorithms can be implemented to extract the communities using a weighted undirected graph based on source IP address data as similarly described above with respect to FIG. 4.

At 708, detecting an anomaly in DNS activity associated with one or more of the communities based on a DNS querying rule is performed. For example, various DNS monitoring rules can be applied to the communities for detecting an anomalous DNS querying rule as similarly described above.

At 710, an action in response to detecting the anomaly in DNS activity associated with the one or more of the communities based on the DNS querying rule is performed. For example, one or more responsive actions can be performed, such as the following: (1) perform a notification (e.g., to the end users and/or system/network administrators); (2) generate a report (e.g., an anomaly report can be included in a DNS network/security report); (3) perform a quarantine action (e.g., quarantine one or more of the malware infected devices from the enterprise network or from accessing sensitive resources on the enterprise network or Internet); (4) perform security scan(s) and/or perform check(s) for OS/application software updates; (5) and/or various other responsive actions can be performed or combinations of the above actions can be performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive DNS log files, wherein the DNS log files include a DNS query and a DNS response for resolution of the DNS query;
      generate a graph based on the DNS log files;

identify a plurality of communities using the graph based on DNS querying patterns; and detect an anomaly in DNS activity associated with one or more of the communities based on a DNS querying rule, comprising to:

perform three or more of the following:

A) determine whether current traffic activity of one or more of the communities exceeds the average observed traffic activity for the one or more of the communities by a predetermined factor; and in response to a determination that the current traffic activity of one or more of the communities exceeds the average observed traffic activity for the one or more of the communities by the predetermined factor, determine that the anomaly in the DNS activity has been detected;

B) determine whether one or more of the communities starts querying young domains relative to a previous querying pattern of the one or more of the communities, wherein a young domain corresponds to a domain created two days ago or younger; and in response to a determination that the one or more of the communities started querying the young domains relative to the previous querying pattern of the one or more of the communities, determine that the anomaly in the DNS activity has been detected;

C) determine whether one or more of the communities starts querying a known indicator of compromise (IOC) relative to a previous monitored pattern of querying of the one or more of the communities; and in response to a determination that the one or more of the communities started querying the known IOC relative to the previous monitored pattern of querying of the one or more of the communities, determine that the anomaly in the DNS activity has been detected; and/or D) determine whether a first DNS querying rate of a current time window for one or more of the communities changes equal to or greater than a preset threshold from a second DNS querying rate of a previous time window for the one or more of the communities; and in response to a determination that the first DNS querying rate of the current time window for the one or more of the communities changes equal to or greater than the preset threshold from the second DNS querying rate of the previous time window for the one or more of the communities, determine that the anomaly in the DNS activity has been detected; and a memory coupled to the processor and configured to provide the processor with instructions.

2. The system recited in claim 1, wherein the graph is a weighted undirected graph.

3. The system recited in claim 1, wherein the graph is a weighted undirected graph based on source IP addresses.

4. The system recited in claim 1, wherein the processor is further configured to:

perform community detection based on association of the DNS querying patterns and source IP addresses in the graph.

5. The system recited in claim 1, wherein the processor is further configured to:

apply the DNS querying rule to one or more of the plurality of communities for detecting the anomaly in the DNS activity associated with the one or more of the plurality of communities.

6. The system recited in claim 1, wherein the processor is further configured to:

store the plurality of communities in a community detection table.

7. The system recited in claim 1, wherein the processor is further configured to:

receive a DNS data stream, wherein the DNS data stream includes a DNS query and a DNS response for resolution of the DNS query.

8. The system recited in claim 1, wherein the processor is further configured to:

receive a DNS data stream, wherein the DNS data stream includes a DNS query and a DNS response for resolution of the DNS query; and process domains queried in the DNS data stream.

9. The system recited in claim 1, wherein the processor is further configured to:

receive a DNS data stream, wherein the DNS data stream includes a DNS query and a DNS response for resolution of the DNS query;

process domains queried in the DNS data stream; and update a community detection table, wherein the community detection table stores the plurality of communities.

10. The system recited in claim 1, wherein the processor is further configured to:

detect a compromised community in the plurality of communities based on the DNS querying pattern rule.

11. The system recited in claim 1, wherein the detecting of the anomaly in the DNS activity associated with one or more of the communities comprises to:

perform the following:

A) determine whether current traffic activity of one or more of the communities exceeds the average observed traffic activity for the one or more of the communities by a predetermined factor; and in response to a determination that the current traffic activity of one or more of the communities exceeds the average observed traffic activity for the one or more of the communities by the predetermined factor, determine that the anomaly in the DNS activity has been detected;

B) determine whether one or more of the communities starts querying young domains relative to a previous querying pattern of the one or more of the communities, wherein a young domain corresponds to a domain created two days ago or younger; and in response to a determination that the one or more of the communities started querying the young domains relative to the previous querying pattern of the one or more of the communities, determine that the anomaly in the DNS activity has been detected;

C) determine whether one or more of the communities starts querying a known indicator of compromise (IOC) relative to a previous monitored pattern of querying of the one or more of the communities; and in response to a determination that the one or more of the communities started querying the known IOC relative to the previous monitored pattern of querying of the one or more of the communities, determine that the anomaly in the DNS activity has been detected; and D) determine whether a first DNS querying rate of a current time window for one or more of the communities changes equal or greater than a preset threshold from a second DNS querying rate of a previous time window for the one or more of the communities; and in response to a determination that the first DNS querying rate of the current time window for the one or more of the communities changes equal or greater than the preset threshold from the second DNS querying rate of the previous time window for the one or more of the communities, determine that the anomaly in the DNS activity has been detected.

12. A method, comprising:

receiving DNS log files, wherein the DNS log files include a DNS query and a DNS response for resolution of the DNS query;

generating a graph based on the DNS log files;

identifying a plurality of communities using the graph based on DNS querying patterns; and detecting an anomaly in DNS activity associated with one or more of the communities based on a DNS querying rule, comprising:

performing three or more of the following:

A) determining whether current traffic activity of one or more of the communities exceeds the average observed traffic activity for the one or more of the communities by a predetermined factor; and in response to a determination that the current traffic activity of one or more of the communities exceeds the average observed traffic activity for the one or more of the communities by the predetermined factor, determining that the anomaly in the DNS activity has been detected;

B) determining whether one or more of the communities starts querying young domains relative to a previous querying pattern of the one or more of the communities, wherein a young domain corresponds to a domain created two days ago or younger; and in response to a determination that the one or more of the communities started querying the young domains relative to the previous querying pattern of the one or more of the communities, determining that the anomaly in the DNS activity has been detected;

C) determining whether one or more of the communities starts querying a known indicator of compromise (IOC) relative to a previous monitored pattern of querying of the one or more of the communities; and in response to a determination that the one or more of the communities started querying the known IOC relative to the previous monitored pattern of querying of the one or more of the communities, determining that the anomaly in the DNS activity has been detected; and/or D) determining whether a first DNS querying rate of a current time window for one or more of the communities changes equal to or greater than a preset threshold from a second DNS querying rate of a previous time window for the one or more of the communities; and in response to a determination that the first DNS querying rate of the current time window for the one or more of the communities changes equal to or greater than the preset threshold from the second DNS querying rate of the previous time window for the one or more of the communities, determining that the anomaly in the DNS activity has been detected.

13. The method of claim 12, wherein the graph is a weighted undirected graph.

14. The method of claim 12, wherein the graph is a weighted undirected graph based on source IP addresses.

15. The method of claim 12, further comprising:

performing community detection based on association of the DNS querying patterns and source IP addresses in the graph.

16. The method of claim 12, further comprising:

applying the DNS querying rule to one or more of the plurality of communities for detecting the anomaly in the DNS activity associated with the one or more of the plurality of communities.

17. A computer program product, the computer program product being embodied in a tangible non-transitory computer readable storage medium and comprising computer instructions for:

receiving DNS log files, wherein the DNS log files include a DNS query and a DNS response for resolution of the DNS query;

generating a graph based on the DNS log files;

identifying a plurality of communities using the graph based on DNS querying patterns; and detecting an anomaly in DNS activity associated with one or more of the communities based on a DNS querying rule, comprising:

performing three or more of the following:

A) determining whether current traffic activity of one or more of the communities exceeds the average observed traffic activity for the one or more of the communities by a predetermined factor; and in response to a determination that the current traffic activity of one or more of the communities exceeds the average observed traffic activity for the one or more of the communities by the predetermined factor, determining that the anomaly in the DNS activity has been detected;

B) determining whether one or more of the communities starts querying young domains relative to a previous querying pattern of the one or more of the communities, wherein a young domain corresponds to a domain created two days ago or younger; and in response to a determination that the one or more of the communities started querying the young domains relative to the previous querying pattern of the one or more of the communities, determining that the anomaly in the DNS activity has been detected;

C) determining whether one or more of the communities starts querying a known indicator of compromise (IOC) relative to a previous monitored pattern of querying of the one or more of the communities; and in response to a determination that the one or more of the communities started querying the known IOC relative to the previous monitored pattern of querying of the one or more of the communities, determining that the anomaly in the DNS activity has been detected; and/or D) determining whether a first DNS querying rate of a current time window for one or more of the communities changes equal to or greater than a preset threshold from a second DNS querying rate of a previous time window for the one or more of the communities; and in response to a determination that the first DNS querying rate of the current time window for the one or more of the communities changes equal to or greater than the preset threshold from the second DNS querying rate of the previous time window for the one or more of the communities, determining that the anomaly in the DNS activity has been detected.

18. The computer program product recited in claim 17, wherein the graph is a weighted undirected graph.

19. The computer program product recited in claim 17, wherein the graph is a weighted undirected graph based on source IP addresses.

20. The computer program product recited in claim 17, further comprising computer instructions for:
   performing community detection based on association of the DNS querying patterns and source IP addresses in the graph.

21. The computer program product recited in claim 17, further comprising computer instructions for:
   applying the DNS querying rule to one or more of the plurality of communities for detecting the anomaly in the DNS activity associated with the one or more of the plurality of communities.

\* \* \* \* \*